April 27, 1948.  J. A. POITRAS  2,440,347
STACKING MACHINE
Filed Nov. 6, 1944  7 Sheets-Sheet 4

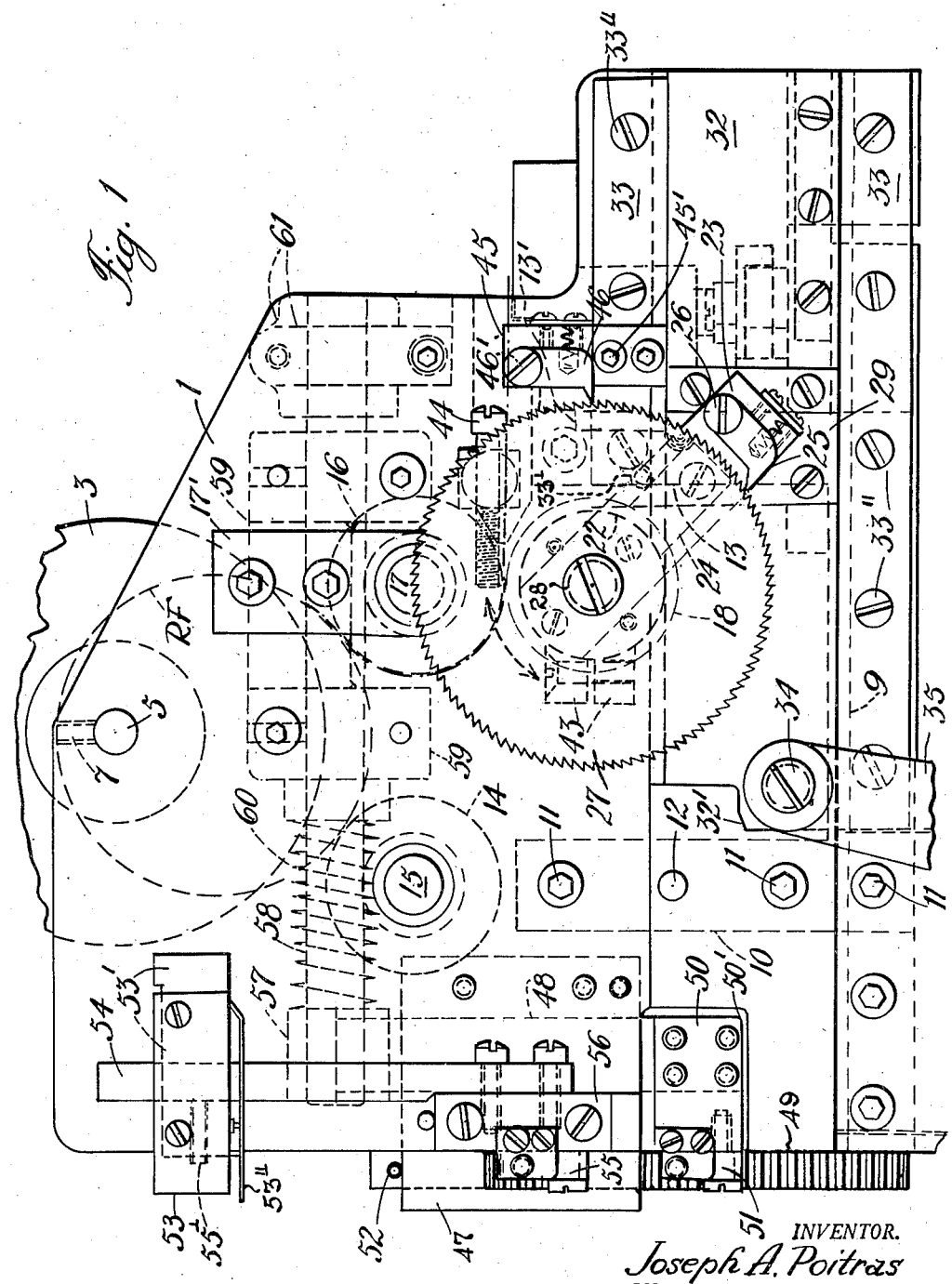

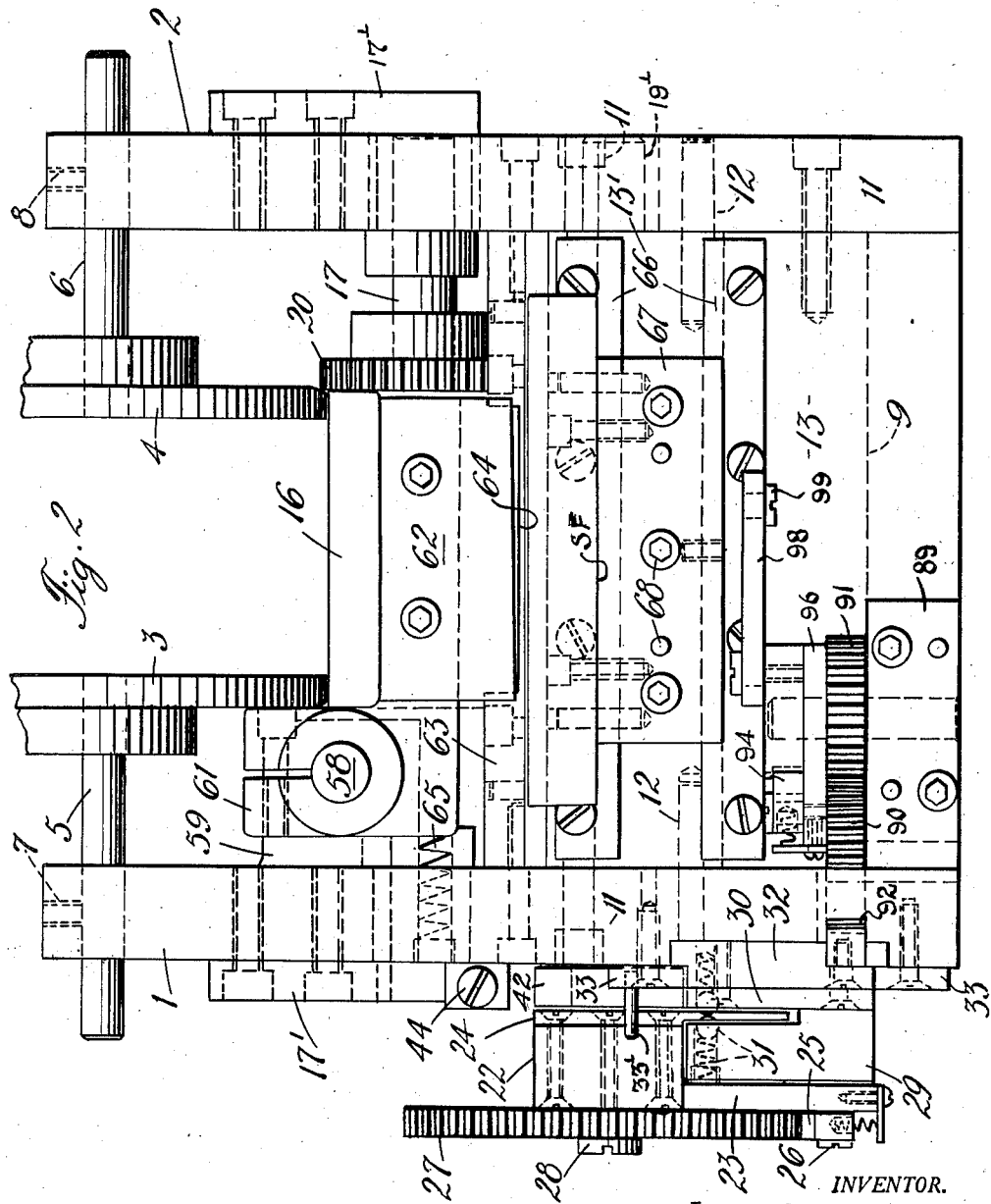

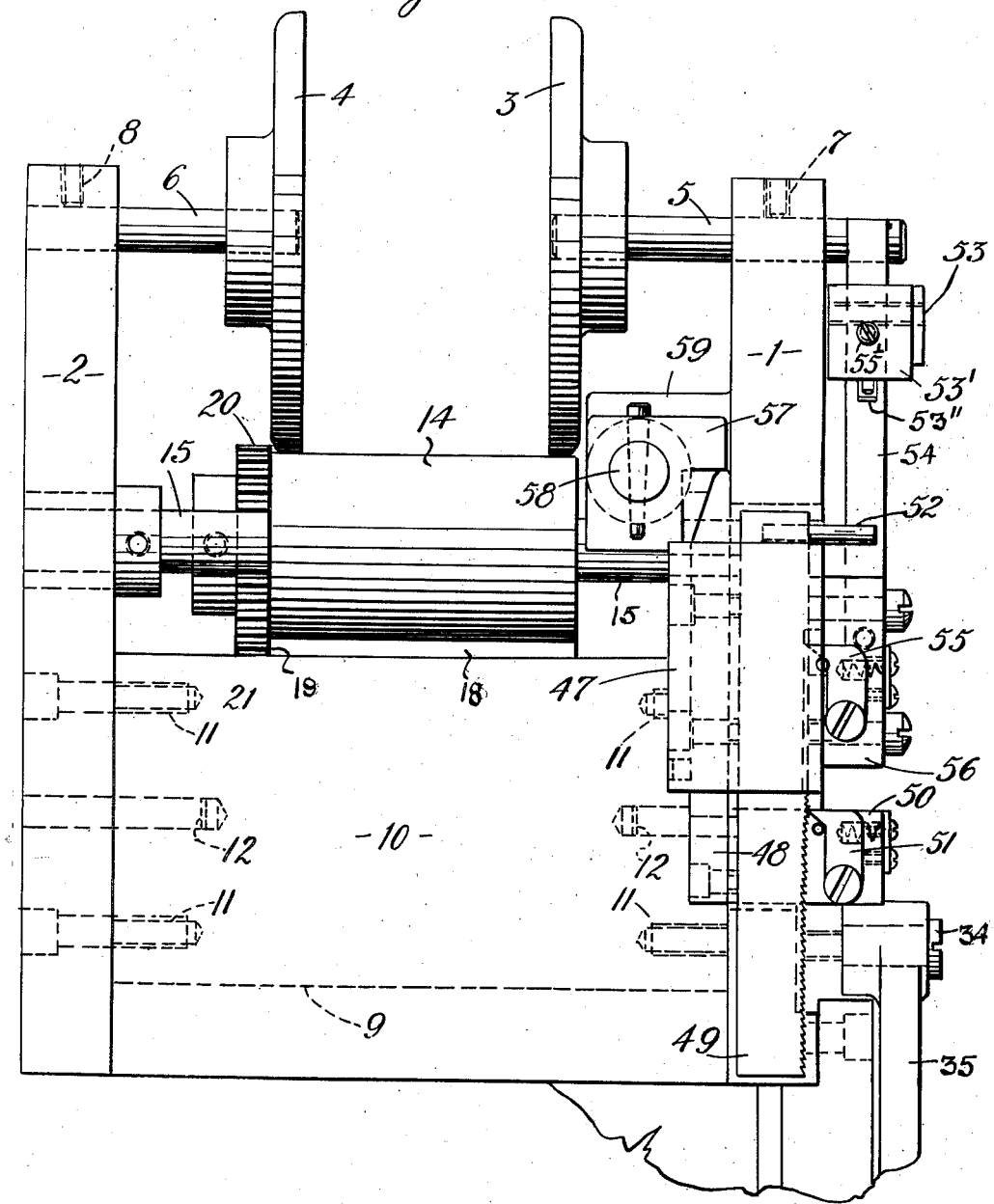

INVENTOR
Joseph A. Poitras
BY Darby & Darby
ATTORNEYS.

INVENTOR.
Joseph A. Poitras
BY Danby & Danby
Att'ys.

April 27, 1948.  J. A. POITRAS  2,440,347
STACKING MACHINE
Filed Nov. 6, 1944  7 Sheets-Sheet 6

INVENTOR.
Joseph A. Poitras
BY
Darby & Darby
Att'ys.

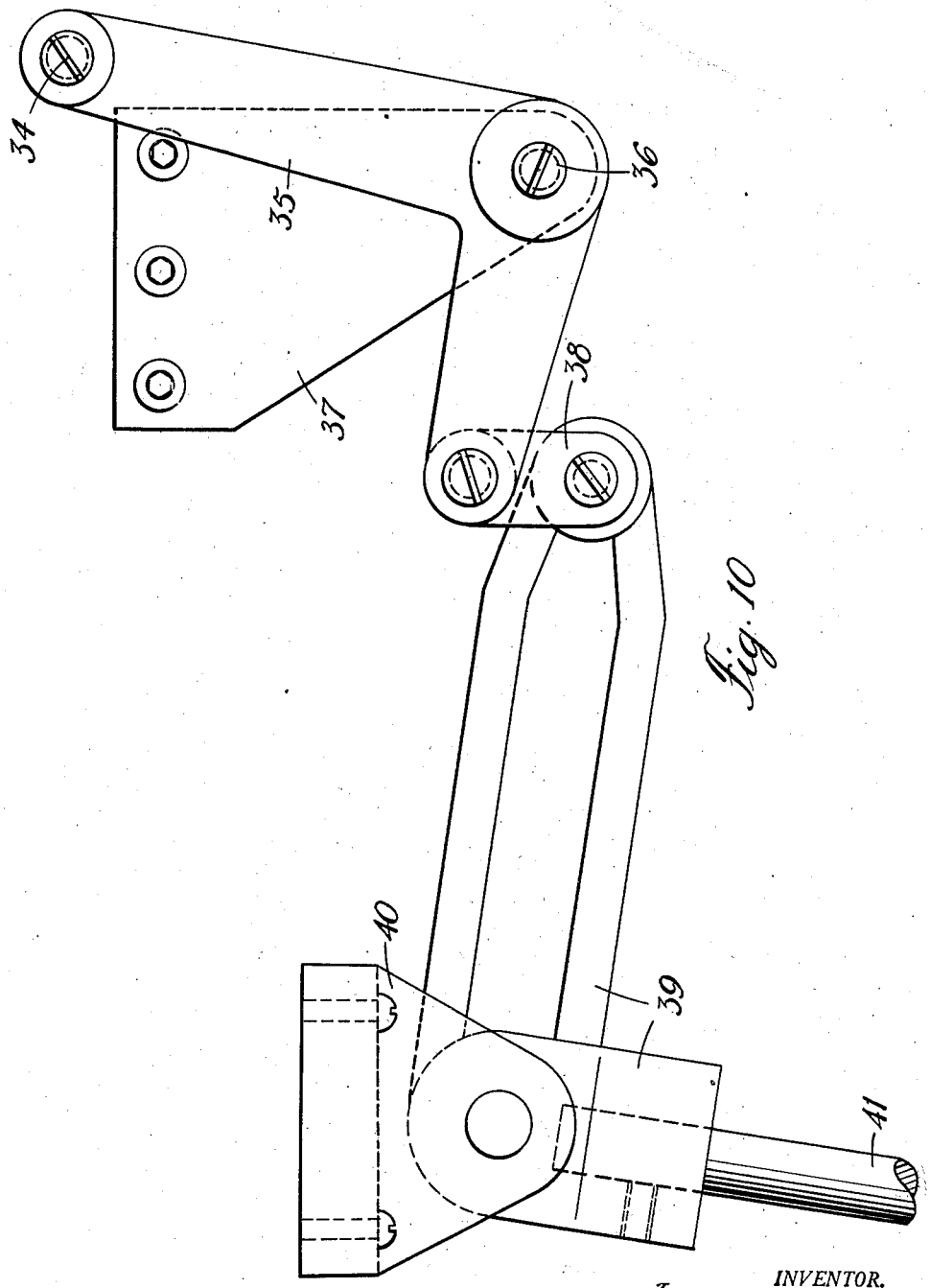

Patented Apr. 27, 1948

2,440,347

UNITED STATES PATENT OFFICE 2,440,347

STACKING MACHINE

Joseph A. Poitras, Fort Lee, N. J., assignor to Solar Manufacturing Corporation, New York, N. Y., a corporation of New York Application November 6, 1944, Serial No. 562,247

2 Claims. (Cl. 270—58)

This invention relates to a machine for facilitating the stacking of small plates or sheets, and is of particular utility in the alternate stacking of plates or sheets of different materials, as for example the conducting and nonconducting layers of an electrical condenser.

As the description of this disclosure proceeds it will become apparent that the subject matter of the invention is applicable to the stacking of a plurality of plates or sheets of any material. Therefore, although the disclosure will be made in reference to the stacking of the insulating and conducting plates of a condenser, it is to be understood that the invention is not limited in its adaptation to this single use.

The main object of the invention is to provide a mechanism by means of which the alternate layers of insulating and conducting plates of an electrical condenser may be properly positioned, as they are stacked, and counted, so as to insure uniformity in the electrical capacity of the resulting condensers.

Broadly considered the mechanism includes means for locating the insulating plates which may be of paper, mica, and other similar materials, in proper position, and for delivering to the stack thus being formed, alternately with the insulating layers, the metal or conducting plates such as tin, lead or aluminum foil. The machine includes mechanism for feeding the tape from a roll of the material, in the case of a condenser, metal foil, cutting it to predetermined lengths to form plates, and delivering them onto the stack, and means for transversely aligning the conducting plates, so as to properly position them in a lateral direction.

An important object of this invention is to provide a mechanism for alternately shifting the stacking fixture in a lateral direction so that the conducting plates which are fed along a fixed axis are caused to project alternately from opposite sides of the stacked insulating plates, previously positioned by hand.

A still further object of the invention is to provide mechanism for automatically counting the number of conducting plates supplied to the stack so that each assembled condenser will accurately include a predetermined number of conducting plates.

Other and further objects of the invention will be apparent from the following detailed description of the embodiment of the invention illustrated in the drawings as a preferable form thereof.

This invention resides substantially in the combination, construction, arrangement and relative location of parts, all as will be described in detail below.

In the accompanying drawings, in which the same reference numbers will be used throughout the figures to indicate the same parts, Figure 1 is a side elevational view of the machine of the invention diagrammatically illustrating some parts and showing several parts broken away;

Figure 2 is a front elevational view of the machine showing some parts diagrammatically and some parts broken away;

Figure 3 is a rear elevational view of the machine with some parts broken away;

Figure 10 is a side elevational view of the main part of the foot actuating mechanism for the machine.

As mentioned above, the description of the construction and operation of the machine will be related to a form of the invention adapted for stacking the insulating and conducting plates of electrical condensers. In this description it will be assumed that the insulating plates are small, thin rectangular plates of mica, and that the conducting plates are of metal foil supplied to the machine in the form of a tape roll, from which each individual plate for the condenser is cut to proper length. As is usual in a condenser of this type, the insulating plates are vertically aligned, being superimposed one upon the other, and the conducting plates are interleaved therewith, and project alternately from opposite sides of the stack a predetermined amount. The projecting portions of the foil thus form two sets of tabs to which the leads of the condenser are conductively connected. It is common practice to enclose such a stack of insulating and conducting plates within a casing which is molded about the stack. The machine herein disclosed, however, is concerned only with the stacking of the insulating and conducting plates.

Figure 4:
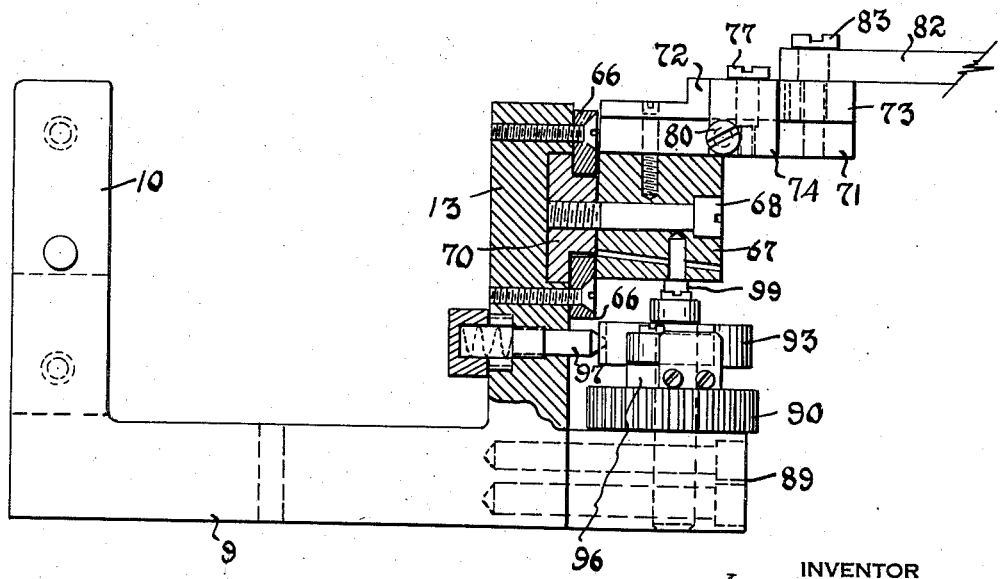
Figure 4 is a side elevational view of a subassembly with some parts in cross-section and some parts broken away, showing the mechanism for supporting the stacking fixture and for shifting it laterally.

Referring now to Figures 1, 2 and 3, it will be seen that the machine comprises a pair of suitably shaped side plates 1 and 2 which are held rigidly in spaced parallel relation by means of a U-shaped casting seen best in Figure 4, comprising a base 9 and a pair of vertical walls 10 and 13. This casting is mounted between the plates 1 and 2 so that the wall 13 is at the front of the machine. The side plates are attached thereto by means of dowels 12 and cap screws 11. Extending transversely of the side plates at the top are a pair of rods 5 and 6 which are locked in these plates by the respective set screws 7 and 8. Mounted on the rods 5 and 6 are the circular discs 3 and 4 between which the tape roll RF of metal foil may be positioned. By means of this construction the separation between the positioning plates 3 and 4 can be adapted to foil rolls of different tape widths.

Journaled between the side plates by the shaft 15 is a tape roll supporting roll 14, positioned under the guide discs 3 and 4, as will be seen from Figures 1 and 3. In front of the roll 14, and journaled in the adjustable bearing 17' is the shaft 17 on which a supporting and tape feeding roll 16 is positioned, at the end of which is a gear 20 (see Fig. 3). Journaled between the side plates and directly under the roll 16 by shaft 19' (see Fig. 2) is a tape feeding roll 18, at the end of which is a gear 19 (see Fig. 3) meshing with the gear 20. In order to simplify as much as possible the showing in Figure 1 the dotted circles 16 and 18, as illustrated in that figure, really represent the pitch circles of the gears 19 and 20. The foil roll RF when positioned between the guide plates 3 and 4 rests on the rolls 14 and 16, as will be seen from Figure 1. The end of the tape passes in back of roll 16 and is advanced forwardly of the machine towards the operator, who would sit at the right (Fig. 1) facing the machine, by passing between the rolls 16 and 18, which feed the tape. As will appear later, the rolls 16 and 18 are driven during the feeding operation, while roll 14 is an idler roll, so that the roll of foil RF will be rotated as the tape is fed from it.

Figure 9:
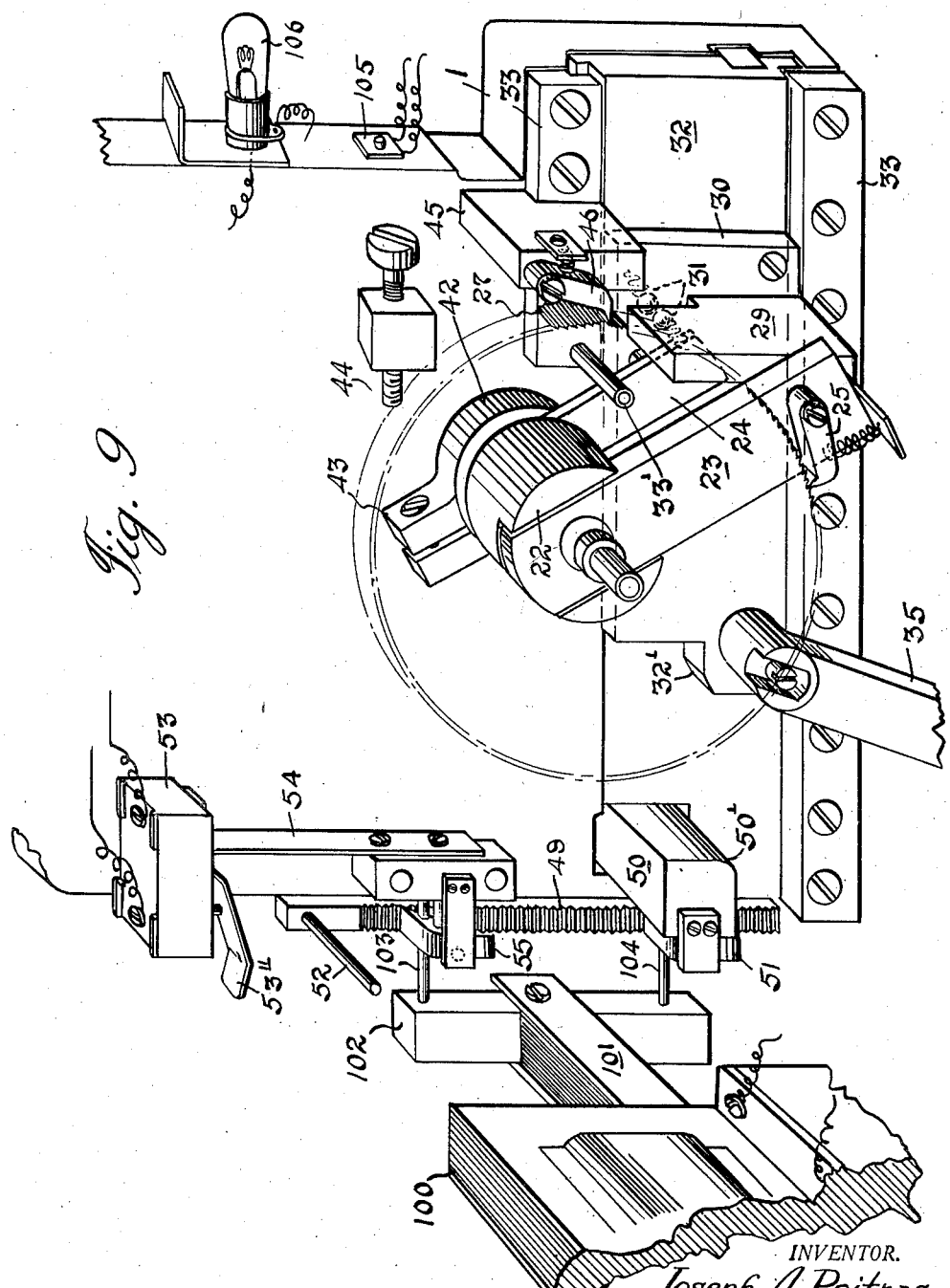
Figure 9 is a perspective view including diagrammatic portions with some parts broken away, illustrating the counting mechanism.

The end of the shaft 19' which supports the roll 18, projects from the left hand side of the machine (see Fig. 2), and has rotatably mounted thereon a collar 22, in the slotted end of which is secured one end of the lever 23 (see Fig. 9). Secured to the inside face of the collar 22 is a lever 24, which is radially aligned with the lever 23. Secured on shaft 19' is a large ratchet wheel 27, locked on the shaft by means of the screw 28. Pivotally mounted on the screw 26 on arm 23 is a spring loaded pawl 25, engaging the teeth of the ratchet wheel 27. Secured to the bar 32, adjacent the free end of arm 24, is a support for the spring biased ball detents 31 comprising a front plate 29 and a back plate 30, defining a passage into which the end of arm 24 may operate. The bar 32 is longitudinally reciprocable in a groove in the outer face of side plate 1 (see Figs. 1 and 2), which with the bars 33 attached to the side plates 1 by the screws 33'' forms a guideway for the bar 32. The bar 32 is rabbeted along its top and bottom edges to form guiding faces cooperating with the bars 33. The upper bar 33 is provided at its rear end with a projecting pin 33' forming a stop to be engaged by the arm 24 upon its return stroke (see Fig. 9). The rear end of the bar 32 is notched, as shown in Figure 1, and provided with an inclined cam surface 32' for a purpose to be described later.

Longitudinal reciprocation of bar 32 may be effected in any suitable manner, as for example by means of the foot operated lever system disclosed particularly in Figure 10. A bell crank lever 35 is pivotally attached at 34 to the bar 32 and is pivotally mounted at 36 on a plate 37, which may be attached to the support for the machine. The other end of the bell crank 35 is pivotally connected by a link 38 to a bell crank lever 39 which is pivotally mounted on a bearing bracket 40, likewise attached to the support for the machine. The other arm 41 of the bell crank extends downwardly to a foot treadle (not shown) by means of which it may be rocked back and forth, causing reciprocation of the bar 32.

Also mounted on the projecting end of shaft 19' (see Fig. 2) is a split collar 42 having radial extensions 43 (see Fig. 1), connected by means of a screw for adjustably clamping the collar in any desired circumferential position on the shaft. The extensions 43 on the collar are positioned to engage an adjustable screw 44 mounted on the side plate 1 (see Figs. 1 and 9); the function of these parts will be referred to later. A second spring biased pawl 46 engages the ratchet wheel 27 and is pivotally mounted at 46' on a block 45, attached to the side plate 1 (see Figs. 1 and 9). The supporting block 45 is attached to the side plate 1 by means of the cap screws 45' (see Fig. 1).

Attached to the rear edge of side plate 1 is a suitably shaped guide block 47 forming a guideway for the vertical reciprocable ratchet bar 49 and the camming bar 48 (see Fig. 3). Attached to the lower end of the camming bar 48 is a plate 50 (see Fig. 1) which serves as a support for a spring biased pawl 51, pivotally mounted thereon and positioned to engage the teeth of the ratchet bar 49 (see Fig. 3). The lower front corner 50' of the camming bar 48 is positioned to cooperate with the camming surface 32' on the bar 32 (see Fig. 1). The upper end of the ratchet bar 49 is provided with a transversely projecting pin 52 which has several functions, one of which is to limit the downward movement of the ratchet bar 49 by engaging the top of the guide block 47. Attached to the outer face of the side plate 1 at its rear edge is a support 56 (see Fig. 1) which in turn pivotally supports a spring biased pawl 55 also engaging the teeth of the ratchet bar 49. Mounted in support 56 is a vertically extending bar or rod 54 on which is mounted a support 53' for a microswitch 53. The support 53' is vertically adjustable on the rod 54, and is locked in any desired position by means of a set screw 55'. The operating arm for the microswitch is shown at 53'', and is positioned to be engaged by the transverse pin 52 at the upper limit of travel of the rack bar 49.

Attached to the inner face of the side plate 1 is a suitably shaped bearing member 59 for a horizontal shaft 58, lying along the inner face of the side plate. The rear end of shaft 58 is provided with a lever 57 (see Fig. 3), for cooperation with the upper end of the camming bar 48. A coil compression spring 60 encircles the shaft 58 and acts on the shaft to force it rearwardly causing the shearing blade 62 to engage the shearing bar 63 under pressure, insuring good shearing cooperation of the shearing edges on blade 62 and bar 63.

Attached to the front end of shaft 58 (see Fig.

2) is a lever 61 on which is mounted a shearing blade 62. The lower cutting edge of the shearing blade 62 cooperates with a shearing edge 64 on a shearing bar 63, attached to the top edge of the front wall 13 of the side plate brace. The shearing edges of the members 62 and 63 are normally separated as shown in Figure 2, so that the foil tape may issue forwardly of the machine between these cutting edges, when fed by the rolls 16 and 18. Since the roll 16 is not directly journaled in the side plates 1 and 2, but is journaled in a pair of vertically adjustable bearing blocks 17' attached to the side plates, the roll 16 may be vertically adjusted with respect to the roll 18, to insure the proper gripping and feeding action of the rolls 16 and 18 for the metal tape. A spring 65 mounted in the side plate 1 engages the supporting lever 61, for the shearing blade 62, to aid in normally holding the shearing blade in the position shown in Figure 2.

Turning now to Figure 4, it will be seen that the front face of the front wall 13 of the cross brace is provided with a horizontal groove which is overlapped by a pair of guide bars 66 (see also Fig. 2), forming a guideway for the support for the stacking fixture. This support includes a block 67 attached to a T-shaped slide 70 by means of the screws and dowels 68. Thus the support 67 can slide horizontally in a transverse direction with respect to the front of the machine. The stacking fixture is diagrammatically illustrated at SF in Figure 2 to clearly show its position. However, it is shown in greater detail in Figures 4, 6, 7 and 8.

Figure 6:
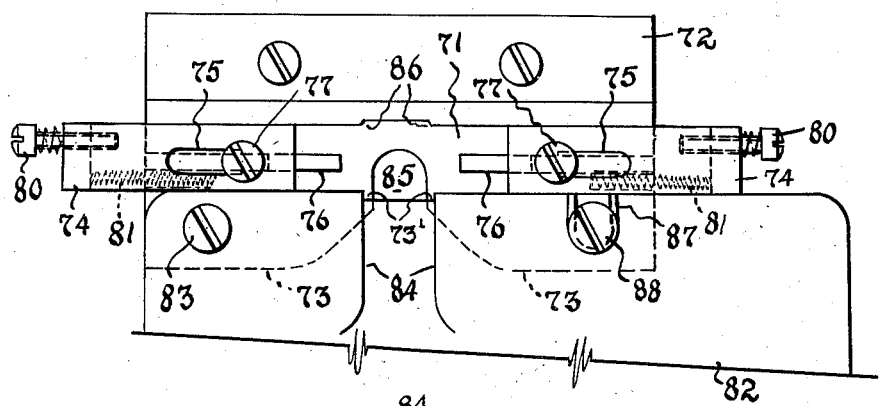
Figure 6 is a top plan view of the stacking fixture with a portion of the worktable broken away.

The stacking fixture which is attached to the top of the support block 67 by means of screws includes a base plate 71 along the rear edge of which is mounted an L-shaped guide bar 72. In front of this guide bar and at the front edge of the base plate 71 are a pair of bars 73 having their inner ends spaced at the center of the fixture, as is clear from Figure 6. The bar 72 and the bars 73 form a channel extending transversely of the base plate 1 in which the indexing bars 74 may slide. These indexing bars are provided with elongated slots 75 so as to have limited sliding movement on the base plate on the screws 77. The base plate 71 is provided with keyways 76 in which projections 74' on the bottom faces of the indexing bars 74 slide. Springs 81 normally hold the indexing bars 74 in their extreme outward positions, as shown in Figure 6. Adjustable stop screws 80 are mounted on the bars 74 so as to engage the base plate 71 when the bars are moved towards the center to limit the distance which they may move inwardly.

Figure 7:
Figure 7 is a front elevational view thereof.
Figure 8:
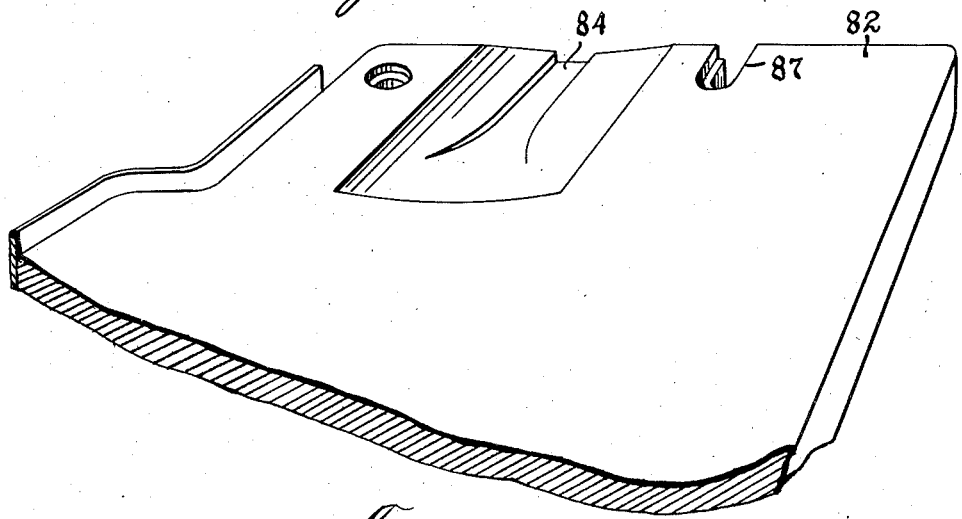
Figure 8 is a perspective view of a portion of the worktable.

Pivotally mounted on this fixture by means of the screw 83 is a worktable 82 which is provided with an open slot 87 at its rear edge for guiding and supporting engagement with a headed screw 88. Thus the worktable 82 may be swung in a clockwise direction looking down on it, into and out of position, as will be described shortly. The base plate 71 is provided with a finger recess 85 which is aligned with the ends of the short bars 73 and with a guideway 84 cut in the top of the worktable and best seen in Figure 8. Attention is also called to the shallow notch 86 in the front vertical face of the L-shaped bar 72, and the notched corners 73' of the bars 73. In stacking condensers of the type for which this particular embodiment of the invention was developed, the notches 86 and 73' serve as the means for properly positioning the mica insulating plates, as they are slid into position down the guideway 84 into seating relation with these notches. Figure 7 is a front edge view of the stacking fixture.

Also supported on the front wall 13, of the bracing member for the side plates, in a supporting block 89 which is secured in place by means of screws and dowels, as shown. Journaled on the top of this support are a pair of meshing gears 90, 91. The gear 90 meshes with a rack 92 secured to the inside face of the bar 32, and is exposed through an opening in the side wall 1. Mounted on the gear 91 and secured thereto is a block 96 on which is pivotally mounted a pawl 94 biased by a spring 95 to alternately engage a pair of diametrically opposed notches on the indexing disc 93. The gear 91 and support 96 are secured together for conjoint movement while the indexing disc 93 is freely mounted on the bearing pin for the gear 91 and is driven by means of the pawl 94. A spring pressed detent 97 mounted on the wall 13 cooperates with a pair of diametrically opposed indexing notches in the disc 93. A link 98 pivotally interconnects the indexing disc 93 with the support 67 for the stacking fixture by means of a pivot screw 99. This connection is not shown in Figure 2 because the stacking fixture support is shown in central position, whereas the link 98 and driving mechanism for reciprocating the stacking fixture is shown in the position corresponding to the right hand position of the stacking fixture.

The remaining structural features of the invention are illustrated in Figure 9. They include an electromagnet 100 having a reciprocable armature or core 101 provided with a transversely extending bar 102 at its end in which are mounted the pins 103 and 104. Pins 103 and 104 are respectively pivotally connected to the rack bar pawls 55 and 51. A switch 105 at the front of the machine is provided for energizing the winding of the electromagnet 101, by means of an obvious circuit and current source, not shown. At 106 is a signal light which is to be connected by a suitable circuit and current source, of obvious form, to the microswitch 53. The electromagnet and associated equipment provides mechanism for releasing the counting device upon the completion of a stack to return it to position for the next operation, as will be described more fully in the operation of the machine.

A complete description of the operation of the mechanism follows. It is to be assumed that all of the parts are in the position illustrated in Figures 1 and 2 with the exception that the stacking fixture instead of being in the centralized position shown in Figure 2 will be to the right so that the axis of the seat, in support 67, for the connecting pin 99 will coincide with the axis of the pin 99. It will also be assumed that a roll of foil tape RF is in position with the tape extending between the rolls 16 and 18 and up to the shearing edges. It is further to be assumed that the worktable 82 is in work position as shown in Figure 6. The operator slides a piece of mica down the guideway 84 into position so that its rear corners engage the ends of the notch 86 and its front corners lie in the notches 73. This exactly positions the insulating plate. The operator then depresses the treadle at the lower end of lever 41 (Fig. 10), causing the bar 32 to slide to the rear of the machine. The spring pressed balls 31 being carried by this bar and being in engagement with the front edge of lever 24, drive that lever in a clockwise direction (Fig. 1), causing clockwise rotation of lever ratchet wheel 27 and, of course, clockwise rotation of roll 18. Lever 23 carries ratchet wheel 27 with it by reason of the engagement of the pawl 25 with the teeth thereof. Due to the gears 19 and 20 roller 16 will revolve in a counterclockwise direction so that the metal foil is fed forwardly between the edges of the shears. This motion continues until the lugs 43 on collar 42 engage the stop 44, which parts have been adjusted so that a proper length of foil will be projected between the shearing edges. During this operation the spring biased pawl 46 slides over the teeth of the ratchet wheel 27. When lugs 43 engage the stop 44, further rotation of shaft 19 and connected parts is interrupted, which action can occur because the spring pressed balls 31 will yield and pass by the lever 24. The operating mechanism for the feed rollers 16 and 18 remain in that position while the bar 32 continues its rearward travel. Near the end of the stroke of the bar 32 the camming surface 32' engages the camming surface 50' on the lower end of the camming bar 48. This raises the camming bar 48 a predetermined distance, carrying the spring biased pawl 51 with it, which by reason of its engagement with the teeth of the ratchet bar 49 raises it a predetermined amount.

The upper movement of the cam bar 48 by reason of its engagement with the lever 57, Fig. 3, causes counterclockwise rotation of shaft 58 when viewed from the rear, and hence clockwise rotation when viewed from the front, Fig. 2. This causes the shearing blade 62 to swing downwardly to cooperate with the fixed shearing edge 64, and cut off the projecting end of the metal tape. The severed plate, thus formed, drops down upon the previously placed insulating plate with one end projecting beyond the insulating plate to the right (viewing the machine from the operator's position). This is so because during the rearward movement of bar 32 gears 90 and 91 were rotated by the rack 92 attached to the back of bar 32. The resulting rotation of gear 91 has caused counterclockwise rotation (Fig. 5) of the indexing disc 93 by reason of the fact that the support 96 for the spring biased pawl 94 is rotated in the same direction because of its connection with the gear 91. The parts are so proportioned that by the time the bar 32 reaches the end of its stroke in a rearward direction the index disc 93 has been rotated 180 degrees, pulling link 98 to the left so as to be in a diametrically opposite position with respect to that shown in Figure 5. This movement of the link 98 to the left carries the stacking fixture to the left. It will be understood that since the support 96 is connected to gear 91 it will have moved around from the position shown in Figure 5, to the diametrically opposite position. To insure that the stacking fixture is in proper position the spring pressed detent 97 engages the indexing notch of disc 93 provided for the purpose. It is for this reason that the foil plate drops down onto the insulating plate with its end projecting beyond the insulating plate to the right thereof as stated above.

The operator then returns the foot treadle mechanism back to its beginning position, which return can be aided by the proper counterweight, not shown, as is usual for similar devices. This return movement of the foot operated mechanism carries bar 32 back to its initial position. It will be recalled that the spring pressed balls 31 are now at the lower edge or side of lever 24.

Thus, as the bar 32 moves back to the right (Fig. 1), arms 23 and 24 move in a counterclockwise direction. During this movement the ratchet wheel 27 will be held against return movement by the spring biased pawl 46. This operation continues until the upper edge of lever 24 strikes the fixed stop pin 33' (Fig. 9). The bar 32 and attached parts will continue its movement towards the front of the machine since the spring pressed pawls will yield and ride over the arm 24. This insures that the arm 24 and attached parts will return to the same position each time. In the meantime the operator has slipped the second plate of insulating material down the groove 84 onto the top of the foil plate which has just been deposited. During the return movement of the bar 32 the stacking fixture does not move because the spring biased pawl 94 is moving in a clockwise direction with respect to the indexing disc 93 as gear 91 rotates back to its original position, carrying the support 96 with it.

Figure 5:
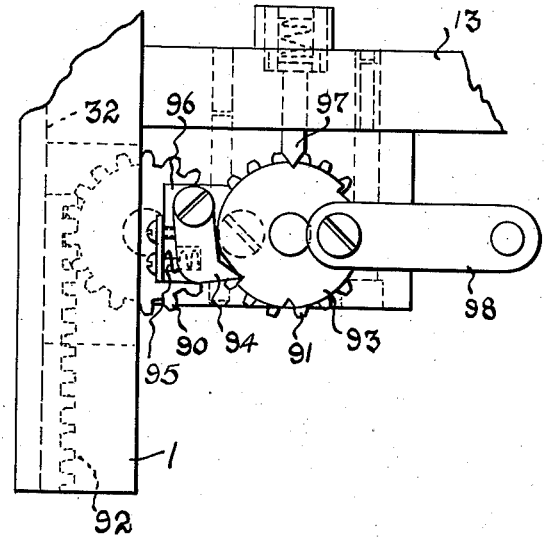
Figure 5 is an enlarged detail top plan view of the mechanism for shifting the stacking fixture laterally.

The operator again depresses the foot treadle to repeat the operations which are the same as those previously described, with the exception of the fact that the indexing disc 93 is rotated in the same direction, that is counterclockwise another 180 degrees, to move the link 98 back to the position shown in Figure 5, carrying the stacking fixture with it to the right, so that when the next metal plate drops down onto the stack its end will project to the left thereof. Of course, rack bar 49 has moved up another step. These operations continue until a predetermined number of metal plates have been deposited on the stack, which fact is signaled by the arrival of the rack bar 49 to a point where its projecting pin 52 will engage the operator 53'' of the microswitch and close it. The closing of microswitch completes a circuit to the signal lamp 106, signaling the operator that the desired number of metal foils have been deposited on the stack. Thus the condensers assembled with the aid of this machine will be insured of uniform capacity characteristics by the counting mechanism, which does not require any conscious thought on the part of the operator.

Upon energization of the signal lamp 106 the operator deposits another insulating plate on top of the stack and then presses the indexing bars 74 inwardly (Fig. 6) as far as they will go, as determined by the setting of the screws 80. The facing ends of the indexing bars 74 engage the projecting ends of the metal plates and slide them towards each other from opposite sides, insuring an accurate overlapping or interleaving of the metal plates with respect to each other and the insulating plates, so that the active portions of the condenser will be accurately aligned transversely, and the projecting ends, to which the leads are to be attached, will likewise be aligned. The operator then swings the worktable 82 about the pivot screw 83, so that the stack may be grasped from above and from below through the finger opening 85 for removal from the machine. Of course, the indexing bars return to normal position shown in Figure 6, under the influence of springs 81, as soon as they are released. Worktable 82 is then swung back into position, as shown in Figure 6. Switch 105 is closed to energize the winding of the resetting electromagnet 100 which by attracting its core 101 releases the pawls 51 and 55 so that the rack bar 49 can drop down to starting position, as shown in Figure 1. The machine is now ready to repeat the operation of stacking the next condenser.

It will be understood by those skilled in the art that by the proper adjustment of the collar 42 and screw 44 any desired width of plate cut off from the foil tape can be determined upon within the capacity of the machine. The yielding connection between the mechanism for driving the feed roller 18 and the bar 32 insures that for any setting of these parts all the sheared off tape lengths will be of the same length. This is true because on the return stroke the arm 24 and connected parts is always brought back to the same position, by engaging the stop pin 33'. In a feeding direction the movement of this mechanism is limited by the engagement of lugs 43 with the screw 44. Circumferential adjustment of collar 42 on shaft 19' permits a rough determination of the foil lengths to be cut and adjusting screw 44 permits a final and more accurate setting.

The number of foil plates stacked in each condenser is predetermined by vertically adjusting the position of the microswitch 53 on the support 54 by means of the set screw 55, as previously explained. Thus any number of metal foils may be stacked in each condenser as predetermined by this adjustment and, of course, within the capacity of the machine. The transverse position of the metal plates within the stack can be determined by adjusting the screws 80.

It will be readily apparent from the above description that the mechanism herein disclosed is eminently adapted to increase the speed and accuracy with which plates or sheets may be stacked, and particularly conducting and insulating plates comprising an electrical condenser. One source of error in an entirely hand stacking method, that is the necessity for remembering or counting the number of metal plates put into the stack, is eliminated by the automatic counting mechanism, which requires no other conscious effort on the part of the operator other than to observe the lighting of the lamp 106.

From the above description it will be apparent to those skilled in the art that the subject matter of this invention is not limited to the exact form of structure herein disclosed for the purpose of teaching the reproduction of this invention. I do not, therefore, desire to be strictly limited to the disclosure, but rather by the true scope of the appended claims.

What is claimed is:

1. In a condenser stacking machine, the combination comprising means for feeding a tape foil along a defined path, means for shearing the tape into pieces of predetermined length, a stacking fixture positioned to receive the sheared lengths, means actuated with said shearing means for transversely shifting said fixture alternately to the right and left of said path for each operation of the feeding means so that successive sheared pieces are stacked on said fixture alternatively displaced with respect to the center of the stack and means forming part of said stacking fixture for guiding an insulating sheet centrally of said stacked pieces.

2. In a condenser stacking machine, the combination comprising means for supporting a foil tape roll, means for feeding the tape from said roll in predetermined lengths, means actuated with the feeding means for shearing the tape at the end of each feeding operation, a stacking fixture positioned to receive said sheared pieces in stacked relation, means for supporting said stacking fixture for movement alternatively to opposite sides of the center line of said tape, means for conjointly operating said last means and said feeding means and means supported on said stacking fixture for guiding an insulating sheet centrally of the sheared pieces stacked on said fixture.

JOSEPH A. POITRAS.

REFERENCES CITED

The following references are of record in the file of this patent:

UNITED STATES PATENTS

| Number | Name | Date |
| --- | --- | --- |
| 748,198 | McDowell et al. | Dec. 29, 1903 |
| 1,941,106 | Park, Jr. | Dec. 26, 1933 |
| 2,352,926 | Weiss | July 4, 1944 |

FOREIGN PATENTS

| Number | Country | Date |
| --- | --- | --- |
| 1,463 | Great Britain | Jan. 21, 1908 |
| 5,444 | Great Britain | Nov. 15, 1882 |
| 172,160 | Great Britain | Oct. 3, 1916 |